(12) United States Patent
Miller et al.

(10) Patent No.: US 7,630,490 B2
(45) Date of Patent: Dec. 8, 2009

(54) METHOD AND APPARATUS FOR DC FEED

(75) Inventors: Merle L. Miller, Austin, TX (US); Jin Li, Austin, TX (US)

(73) Assignee: Zarlink Semiconductor (U.S.) Inc., Ontario (CA)

( * ) Notice: Subject to any disclaimer, the term of this patent is extended or adjusted under 35 U.S.C. 154(b) by 1671 days.

(21) Appl. No.: 09/752,160

(22) Filed: Dec. 29, 2000

(65) Prior Publication Data

US 2002/0118818 A1    Aug. 29, 2002

(51) Int. Cl.
*H04M 1/00* (2006.01)
*H04M 9/00* (2006.01)

(52) U.S. Cl. .................................. 379/413; 379/413.01
(58) Field of Classification Search ............ 379/399.01, 379/399.02, 413, 413.01
See application file for complete search history.

(56) References Cited

U.S. PATENT DOCUMENTS

| | | | |
|---|---|---|---|
| 5,809,109 A | | 9/1998 | Moyal et al. |
| 5,878,133 A | * | 3/1999 | Zhou et al. ............. 379/399.02 |
| 5,889,856 A | * | 3/1999 | O'Toole et al. ........ 379/399.02 |
| 5,926,544 A | * | 7/1999 | Zhou ..................... 379/399.02 |
| 6,173,241 B1 | | 1/2001 | Zhou |
| 6,671,373 B1 | * | 12/2003 | Pang et al. ............. 379/399.01 |
| 6,735,302 B1 | * | 5/2004 | Caine et al. ................. 379/405 |
| 6,934,384 B1 | * | 8/2005 | Hein et al. ............. 379/399.02 |

* cited by examiner

*Primary Examiner*—Alexander Jamal
(74) *Attorney, Agent, or Firm*—Williams, Morgan & Amerson, P.C.

(57) ABSTRACT

A method and apparatus is provided for DC feed control for a line card. The method includes determining if the line card is operating in a current limit region of a DC feed curve and synthesizing a curve in the current limit region. The method further includes determining a loop voltage based on the synthesized curve, and applying the loop voltage to the subscriber line. The apparatus includes logic capable of determining if the line card is operating in a current limit region of a DC feed curve and capable of determining a loop voltage based on a synthesized curve in the current limit region. The apparatus further includes circuitry for applying the loop voltage to the subscriber line.

16 Claims, 7 Drawing Sheets

METHOD AND APPARATUS FOR DC FEED

BACKGROUND OF THE INVENTION

1. Field of the Invention

This invention relates generally to telecommunications, and, more particularly, to a method and apparatus for DC feed for a telephone line card.

2. Description of the Related Art

In communications systems, particularly telephony, it is a common practice to transmit signals between a subscriber station and a central switching office via a two-wire bi-directional communication channel. A line card generally connects the subscriber station to the central switching office. A line card typically includes at least one subscriber line interface circuit (SLIC) as well as a subscriber line audio-processing circuit (SLAC). The primary functions of the line card may include supplying talk battery, performing impedance matching, determining whether telephonic equipment is on-hook or off-hook, and handling ringing signals, voice signals, and testing signals.

A telephone system needs DC feed to control the battery feed to a subscriber loop. DC feed delivers enough power for long loop and gradually reduces the power for short loop. A digital signal processing algorithm typically controls the DC feed curve. The DC feed provided to the subscriber loop is usually adjusted in response to an impedance change in the subscriber loop, which, for example, may be caused by off-hook to on-hook transitions, or vice-versa.

In a voltage-feed SLIC, the current on the subscriber line may reach high levels, particularly when the impedance level goes low. The impedance of the subscriber loop may decrease, for example, during a transition from on-hook to off-hook. And, if the subscriber loop is relatively a short loop, a transition from on-hook to off-hook may cause even higher levels on the subscriber line. Unless controlled quickly and expeditiously, these high-level currents may cause the line card to oscillate and perhaps may even damage one or more of the electrical components of the line card.

The present invention is directed to overcoming, or at least reducing the effects of, one or more of the problems set forth above.

SUMMARY OF THE INVENTION

In one aspect of the present invention, a method is provided for DC feed control for a line card. The method includes determining if the line card is operating in a current limit region of a DC feed curve and synthesizing a curve in the current limit region. The method further includes determining a loop voltage based on the synthesized curve, and applying the loop voltage to the subscriber line.

In another aspect of the present invention, an apparatus is provided for DC feed control for a line card. The apparatus includes logic capable of determining if the line card is operating in a current limit region of a DC feed curve and capable of determining a loop voltage based on a synthesized curve in the current limit region. The apparatus further includes circuitry for applying the loop voltage to the subscriber line.

BRIEF DESCRIPTION OF THE DRAWINGS

The invention may be understood by reference to the following description taken in conjunction with the accompanying drawings, in which like reference numerals identify like elements, and in which.

Figure 1:
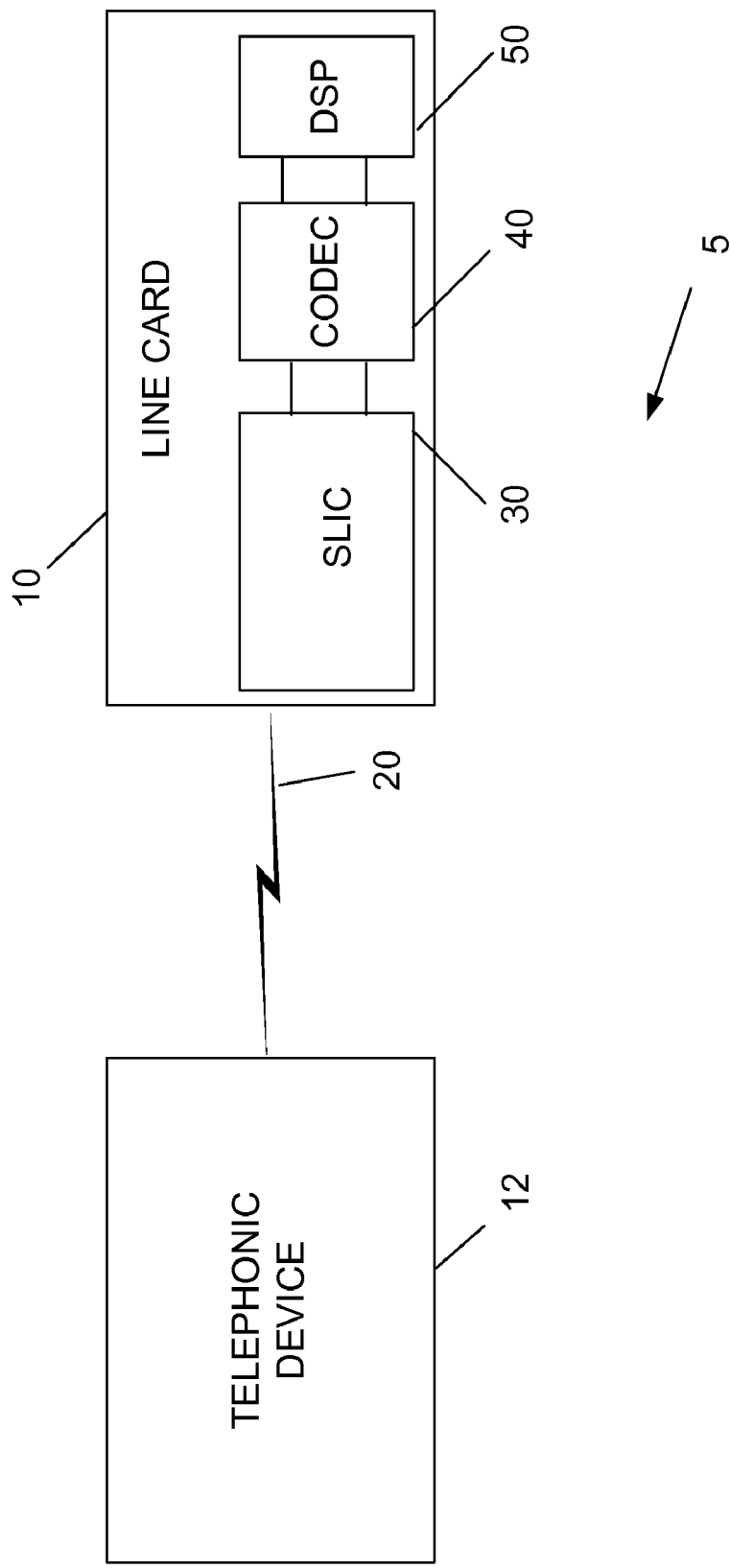
FIG. 1 illustrates a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring first to FIG. 1, a simplified block diagram of a communications system in accordance with the present invention is provided. The communications system 5 includes a line card 10 that interfaces with a telephonic device 12 over a subscriber line 20. In an actual implementation, the line card 10 interfaces with a plurality of subscriber lines 20, but for clarity and ease of illustration, only one is shown. A subscriber line interface circuit (SLIC) 30 is coupled to the subscriber line 20. Hereinafter, signals received by the line card 10 over the subscriber line 20 are referred to as upstream signals, and signals transmitted by the line card 10 on the subscriber line 20 are referred to as downstream signals.

The SLIC 30 supplies an analog upstream signal to a coder/decoder (CODEC) 40. The CODEC 40 receives the analog upstream signal from the SLIC 30 and generates a digital upstream signal that is subsequently passed to a digital signal processor (DSP) 50. The DSP 50 also provides a digital signal for eventual transmission on the subscriber line 20. The CODEC 40 receives the digital signal, converts it to an analog signal, and provides the analog signal to the SLIC 30, which sends the analog signal over the subscriber line 20.

In the illustrated embodiment, the line card 10, in addition to supporting plain old telephone service (POTS), is adapted to support an asynchronous digital subscriber line (ADSL) modem for high bandwidth data transfer. The ADSL protocol is described in ANSI T1.413 Issue 2, entitled, "Interface Between Networks and Customer Installation—Asymmetric Digital Subscriber Line (ADSL) Metallic Interface." The SLIC 30 of the line card 10 is capable of performing a variety of functions, such as battery feed, overload protection, polarity reversal, on-hook transmission, and current limiting. Only relevant portions of the SLIC 30, CODEC 40, and DSP 50 are described herein, although those of ordinary skill in the art will appreciate that these devices may perform other functions that are not described in this disclosure.

The telephonic device 12 may comprise a telephone or any other device capable of providing a communication link between at least two users. In one embodiment, the telephonic device 12 may be one of a variety of available conventional telephones, such as wired telephones and similar devices. In an alternative embodiment, the telephonic device 12 may be any device capable of performing a substantially equivalent function of a conventional telephone, which may include, but is not limited to, transmitting and/or receiving voice and data signals. Examples of the telephonic device 12 include a data processing system (DPS) utilizing a modem to perform telephony, a television phone, and a DPS working in conjunction with a telephone.

Figure 2:
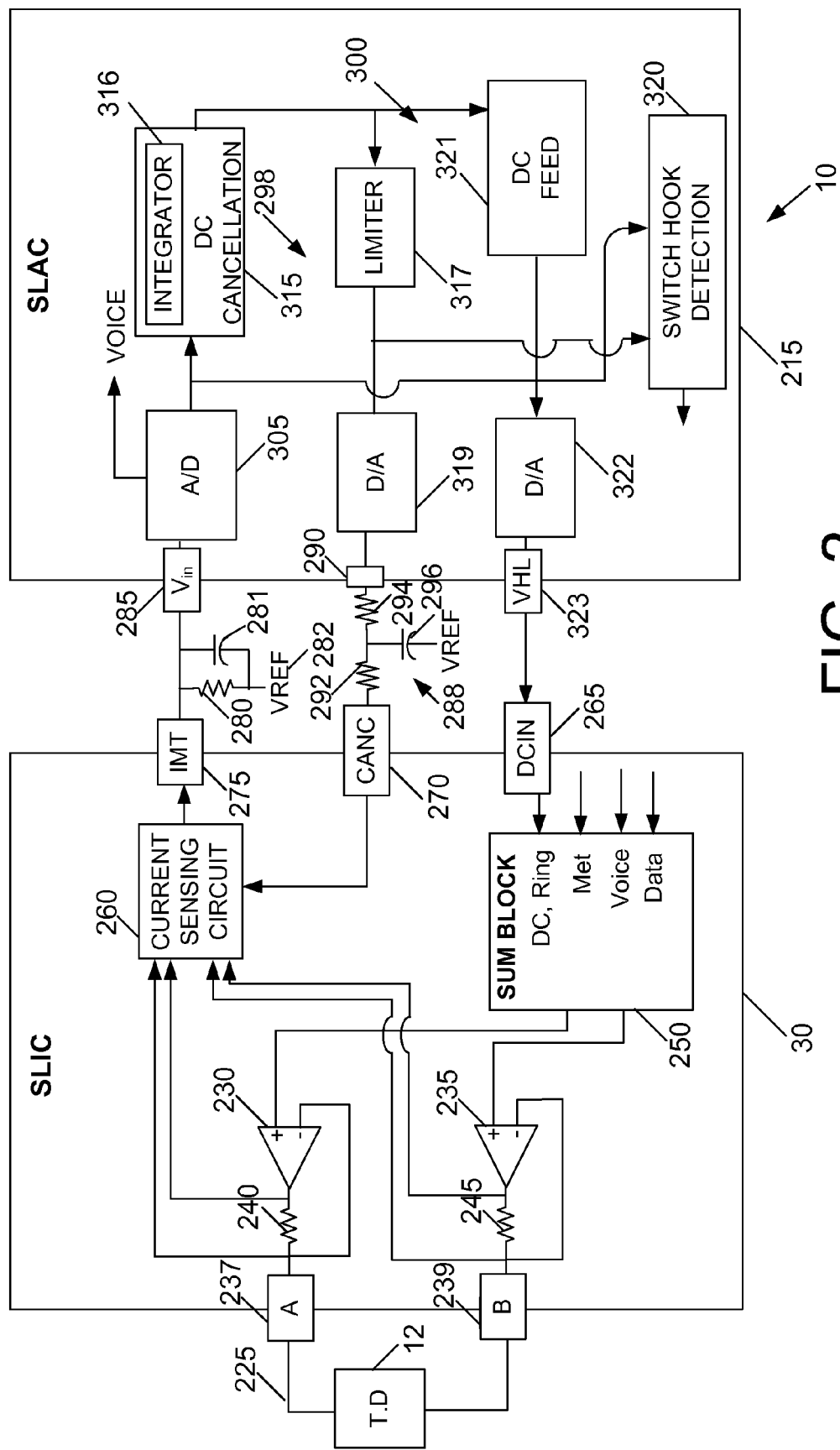
FIG. 2 depicts a block diagram of an embodiment of a line card in accordance with the present invention that may be implemented in the communications system of FIG. 1.

FIG. 2 illustrates one embodiment of the line card 10 in accordance with the present invention. Specifically, the line card 10 includes the SLIC 30, which, in the illustrated embodiment, is a voltage-feed SLIC. The line card 10 also includes the CODEC/DSP 40, 50, which in the illustrated embodiment are shown as a subscriber line audio-process circuit (SLAC) 215 that integrates the functions of both the CODEC 40 and DSP 50. The line card 10 may be located at a central office or a remote location somewhere between the central office and the telephonic device 12 (see FIG. 1). The line card 10 interfaces with the telephonic device 12 through tip and ring terminals 237, 239 at the SLIC 30. The combination of the telephonic device 12 and the subscriber line 20 is generally referred to as a subscriber loop.

The line card 10, which may be capable of supporting a plurality of subscriber lines 20, performs, among other things, two fundamental functions: DC loop supervision and DC feed. The purpose of DC feed is to supply enough power to the telephonic device 12 at the customer end. The purpose of DC loop supervision is to detect changes in DC load, such as on-hook events, off-hook events and rotary dialing, or any other event that causes the DC load to change. In the interest of clarity and to avoid obscuring the invention, only that portion of the line card 10 that is helpful to understanding of the invention is illustrated.

The voltage-feed SLIC 30 is a high voltage bipolar SLIC that drives voltages to the telephone line 225 and senses current flow in the telephone line 225. The SLIC 30 includes first and second differential line drivers 230, 235 that interface with the telephone line 225 via tip and ring terminals 237, 239. The tip terminal 237 is coupled to a first terminal of a first sensing resistor ($R_{ab}$) 240 and to an inverting terminal of the first line driver 230. A second terminal of the first sensing resistor 240 is coupled to an output terminal of the first line driver 230. The ring terminal 239 is coupled to a first terminal of a second sensing resistor ($R_{bd}$) 245 and to an inverting terminal of the second line driver 235. A second terminal of the second sensing resistor 245 is coupled to an output terminal of the second line driver 235.

The SLIC 30 includes a sum block 250 and a current sensing circuit 260. The sum block 250 includes a first output terminal coupled to a non-inverting terminal of the first line driver 230, and a second (inverted) output terminal coupled to a non-inverting terminal of the second line driver 235. The sum block 250 is capable of receiving a DC feed signal (as well as metering and ringing signals) from a DCIN terminal 265, a voice signal, a metering signal, and a data signal and is capable of adding one or more of the received signals and providing it to the first and second line drivers 230, 235. The signals into the SUM block 250 may be subjected to different levels of gain for optimal performance. The signal from the DCIN terminal 265 is low-pass filtered.

The current sensing circuit 260 produces a current proportional to the current through the current sensing resistors 240, 245, subtracts a current proportional to a current from a cancellation terminal (CANC) 270, and provides the resulting current to an IMT terminal 275 of the SLIC 30. Although not so limited, in the instant embodiment, the constant of proportionality for the current from the cancellation terminal (CANC) 270 is unity, and the constant of proportionality for the metallic line current is 0.001. Those skilled in the art will appreciate that only those portions of the SLIC 30 deemed relevant to the invention are disclosed herein. The SLIC 30 may employ resistors (for setting input impedance for signals in the data band) or other circuitry that is not illustrated in FIG. 2.

Although the SLIC 30 illustrated in FIG. 2 is a voltage-feed SLIC in which a voltage is applied to the subscriber loop and a resulting current is measured, it is contemplated that a current-feed SLIC may also be utilized in the line card 10 in accordance with the instant invention. In a current-feed SLIC, a current is fed to the subscriber loop and the measured electrical parameter is the resulting voltage.

The SLIC 30 is connected to the SLAC 215 as well as to an external resistor 280, as well as a capacitor 281. A first terminal of the resistor 280 is coupled to the IMT terminal 275 of the SLIC 210, as well as to the VIN terminal 285 of the SLAC 215. A second terminal of the resistor 280 is coupled to a reference voltage node 282, as well as to a terminal of the capacitor 281. In one embodiment, the reference voltage 282 is in the range of about 1.4 volts. The external resistor 280 and the capacitor 281 form a single-pole low pass filter that is capable of filtering at least a portion, if not all, of the signals above the voice band, such as data signals and metering signals. The combination of the external resistor 280 and the capacitor 281 contributes in converting the current flowing from the IMT terminal 275 to a proportional voltage signal for the SLAC 215. In the DC feed region, the capacitor 281 has reduced effect and may be ignored. Although not necessary, the resistor 280 is external in the illustrated embodiment because in some embodiments it may be useful for the drive value of the resistor to be relatively precise and because each line card 10 may require different values.

A discrete network 288 couples the SLIC 30 to the SLAC 215 via the CANC terminals 270, 290. The discrete network 288 includes a first and second resistor 292, 294 and a capacitor 296. A first terminal of the first resistor 292 is coupled to the CANC terminal 270 of the SLIC 30 and a second terminal of the first resistor 292 is coupled to a first terminal of the second resistor 294. The second terminal of the second resistor 294 is coupled to the CANC terminal 290 of the SLAC 215. The capacitor 296 is coupled between the second terminal of the first resistor 292 and the reference voltage node 296. The discrete network 288 acts as a low pass filter and converts the voltage output signal from the SLAC 215 to a current and provides it to the SLIC 30.

The SLAC 215 interfaces with the telephonic device 12 through the SLIC 30 and over the telephone line 225. The SLAC 215 includes two feedback loops: a DC cancellation loop 298 and a DC feed loop 300. Only those portions of the SLAC 215 deemed relevant to the instant invention are described herein, albeit the SLAC 215 may perform a variety of other functions that are not illustrated in FIG. 2.

The DC cancellation loop 298 includes an analog-to-digital converter 305, DC cancellation logic 315, a current limiter 317, and a digital-to-analog converter 319. In the illustrated embodiment, to reduce hardwire complexity, the voice and DC components of the input signal from the VIN terminal 285 share the same analog-to-digital converter 305. The analog-to-digital converter 305 and digital-to-analog converter 319 include a decimator and interpolator, respectively. The analog-to-digital converter 305 in the illustrated embodiment is capable of providing two output signals, the first output signal is sampled at a 4 KHz frequency and provided as a digital signal to the DC cancellation logic 315, as well as to a switch hook detection logic 320. The second output signal of the analog-to-digital converter 305, comprised of voice and/or data (residual) components, is sampled at 32 KHz and provided to a CODEC (not shown). A residual data component may exist at the output of the analog-to-digital converter 305 since the single-pole low pass filter comprising the external resistor 280 and capacitor 281 may not remove all of the data signal.

The DC cancellation logic 315 receives the digital signal from the analog-to-digital converter 305, integrates it, and provides a substantially DC signal when the loop 298 is closed. The DC signal is provided as an input to the DC feed logic 321, as well as to the current limiter 317. If the output of the DC cancellation logic 315 is greater than ILIM, a value that defines the upper limit of a current limit region of a DC feed curve (discussed in more detail below), then the current limiter 317 outputs a current of ILIM value. The polarity of the output current of the current limiter 317 is typically the same as the polarity of the output of the DC cancellation logic 315. The output of the current limiter 317 is converted to an analog signal and then provided back to the SLIC 30 via the CANC terminal 270. The output of the current limiter 317 is also provided to the switch hook detection logic 320 for switch hook detection during pulse dialing, as described in more detail below. The current provided to the CANC terminal 270 of the SLIC 30 is used to cancel the DC component of the signal from the current sensing circuit 260.

Without sudden or other impedance changes, the line card 10 operates in a "stable" state. During the "stable" state, the signal provided from the VIN terminal 285 of the SLAC 215 to the analog-to-digital converter 305 comprises primarily voice and data (residual) components (i.e., substantially no transient component caused by DC jumps). Thus, during the "stable" state, there is substantially no transients because the current signal provided to the CANC terminal 270 of the SLIC 30 from the SLAC 215 is substantially equal to the loop current during the "stable" state. During the "stable" state, the output of the DC cancellation logic 315 is constant and is proportional to the DC line current. Furthermore, during the "stable" state, when substantially no transients are present, the signal level of the voice and data (residual) components does not exceed a maximum value of the VIN terminal 285. When the signal level of the VIN terminal 285 is not saturated, the DC cancellation loop 298 behaves like a single-pole high pass filter to the CODEC (not shown) and a single-pole low pass filter to the output of the DC cancellation logic 315. This means, as described in more detail below, that the output of the DC cancellation logic 315 may be used to measure the DC feed current by the DC feed logic 321 for supervision purposes.

When impedance fluctuations occur on the subscriber loop, one or more components of the line card 10 may be in a "saturation" state. One instance where the subscriber loop goes into saturation mode is during a transition from off-hook to on-hook state. A transition from an off-hook to on-hook state may occur when a user terminates telephone service by engaging the switch hook, or when the telephonic device 12 employs pulse dialing, which generally comprises pulses generated by a sequence of on-hook/off-hook states. During the "saturation" state, the signal from the VIN terminal 285 of the SLAC 215 may include a voice component, data (residual) component, and transient component due to DC jumps. The signal from the VIN terminal 285 may include other components as well, such as metering signals and the like. To restore the line card 10 to a "stable" state, it is desirable to adjust the output of the DC cancellation logic 315 expeditiously to remove the line card 10 from saturation.

As described in more detail below, the DC cancellation logic 315 may include either a low-pass filter (not shown) having an adjustable bandwidth or an integrator (not shown) having an adjustable gain. The DC cancellation logic 315 includes one or more comparators (not shown) for comparing an incoming signal with preselected values, as described in more detail below. Low-pass filters, integrators, and comparators are generally known in the art; accordingly, these devices are not described in detail herein as one skilled in the art having the benefit of this disclosure is capable of employing these devices in a manner consistent with the instant invention. It should be appreciated that the DC cancellation logic 315 may be implemented either in hardware, software, or a combination thereof.

The DC feed loop 300, in addition to the analog-to-digital converter 305 and DC cancellation logic 315, includes DC feed logic 321 and a digital-to-analog converter 322. It is noted that the present invention employs a common analog-to-digital converter 305 for voice processing as well as for DC feed control. In the illustrated embodiment, the digital-to-analog converter 322 may also interpolate. The output from the digital-to-analog converter 322 is provided to a DCIN terminal 265 of the SLIC 30 via VHL terminal 323 of the SLAC 215. The DC feed logic 321 is capable of providing high DC voltage to the subscriber loop so that sufficient current (20-60 mA) can be driven through a resistance as high as 2K ohms. When the DC conditions on the subscriber loop change suddenly, the DC feed logic 321, in accordance with the present invention, adapts, allowing normal transmission to continue. Examples of sudden changes in DC conditions include on-hook, off-hook, rotary dialing, and tone signaling. When the telephonic device 12 goes off-hook, the loop impedance drops almost instantly to a value below 2K ohms. In short subscriber loops, the loop impedance may be less than 200 ohms. For the line card 10 to function and transmit information properly, the DC conditions on the subscriber loop should be stabilized quickly, and in some cases, within milliseconds.

Figure 3:
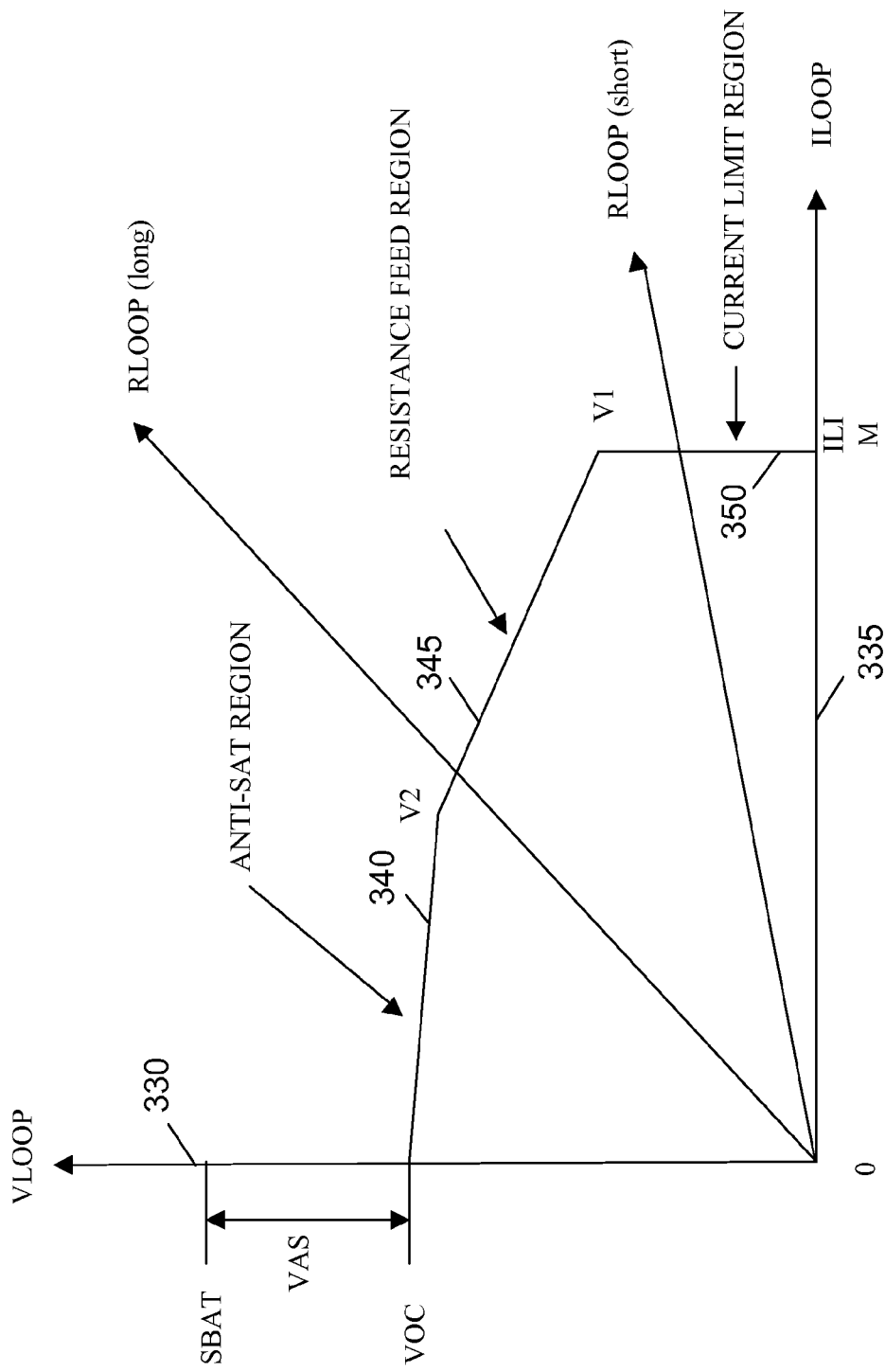
FIG. 3 depicts an exemplary DC feed curve that may be employed by the line card of FIG. 2.

FIG. 3 illustrates an exemplary DC feed curve that may be adapted for use by the DC feed logic 321. A Y-axis 330 represents loop voltage, VLOOP, and an X-axis 335 represents loop current, ILOOP. As can be seen in FIG. 3, although not so limited, the DC feed curve has three operation regions: an anti-saturation region; a resistance feed region; and a current limit region. It may be possible that the DC feed curve may be comprised of only two regions, the anti-saturation region and the current limit region, or a resistance feed region and a current limit region. The anti-saturation region restricts the loop voltage when the loop resistance is too high, such as in the case of a long subscriber loop. The current limit region restricts the loop current in the system when the loop resistance is small, such as in the case of a short subscriber loop. The resistance feed region is the normal working region of the line card 10 without any voltage or current protection. The actual operating point is determined by the intersection point of the subscriber loop resistance and the DC feed curve.

The anti-saturation region is defined by a line 340 that runs between points VOC and V2 and has a slope of RFD_SAT. In the illustrated embodiment, VOC is the difference between a supply battery voltage (SBAT) and an offset voltage (VAS), and V2 is an intersection point of the RFD_SAT line 340 and a line 345. The value of SBAT in the illustrated embodiment is 20-140 volts, although the SBAT value will typically be implementation specific. The value of VAS in the illustrated embodiment is 5-20 volts; however, it may be a programmable value that is provided by an end user. The resistance feed region is defined by the line 345 that runs between points V1 and V2, and has a slope of RFD_FEED. If V2 is less than V1, the resistance feed region does not exist. The current limit region is defined by a line 350 that runs between points V1 and ILIM. The values for V1 and ILIM may be user programmable. The ILIM defines the upper limit of the loop current during operation.

Figure 4:
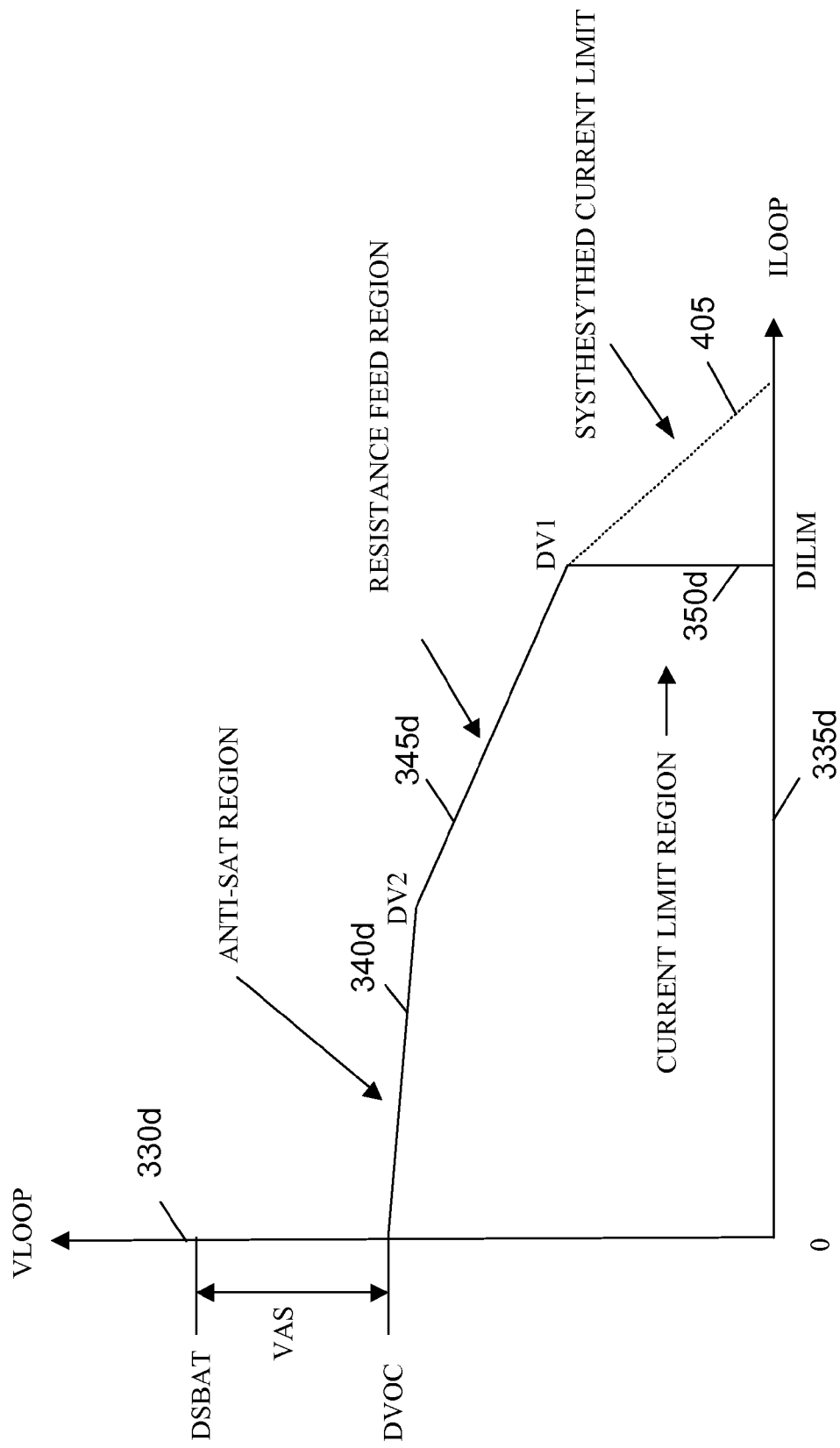
FIG. 4 illustrates a DC feed curve that is implemented by a DC feed logic of the line card of FIG. 2.

FIG. 4 illustrates a DC feed curve of FIG. 3 that is implemented by the DC feed logic 321. As can be seen, the DC feed logic 321 synthesizes a portion 405 of the DC feed curve in the current limit region. The slope of the synthesized portion 405 of the curve is herein denoted as LIMIT_SLOPE. A Y-axis 330d represents loop voltage, VLOOP, in digital domain, and an X-axis 335d represents an output of the DC cancellation logic 315, DINT, also in digital domain. Note that the output of the DC cancellation logic 315 is the integral of the VIN input. Outside the current limit region it is approximately proportional to the line current; however in the current limit region, this may no longer be true. The DC feed logic 321 implements the three operating regions of the DC feed curve in FIG. 3; however, as described in more detail below, the DC feed logic 321 synthesizes curve 405 in the current limit region.

The DC feed logic 321 implements, in digital domain, the anti-saturation region, which is defined by a line 340d that runs between points DVOC and DV2 having a slope of DRFD_SAT. In the illustrated embodiment, DVOC is the digital difference between the supply battery voltage (DSBAT) and an offset voltage (DVAS), and DV2 is an intersection point of the RFD_SAT line 340d and a line 345d. The resistance feed region is implemented in digital form, where the resistance feed region is defined by the line 345d that runs between points DV1 and DV2, and has a slope of DRFD_FEED. If DV2 is less than DV1, the resistance feed region does not exist. The current limit region is defined by a line 350d that runs between points DV1 and DILIM.

Figure 5:
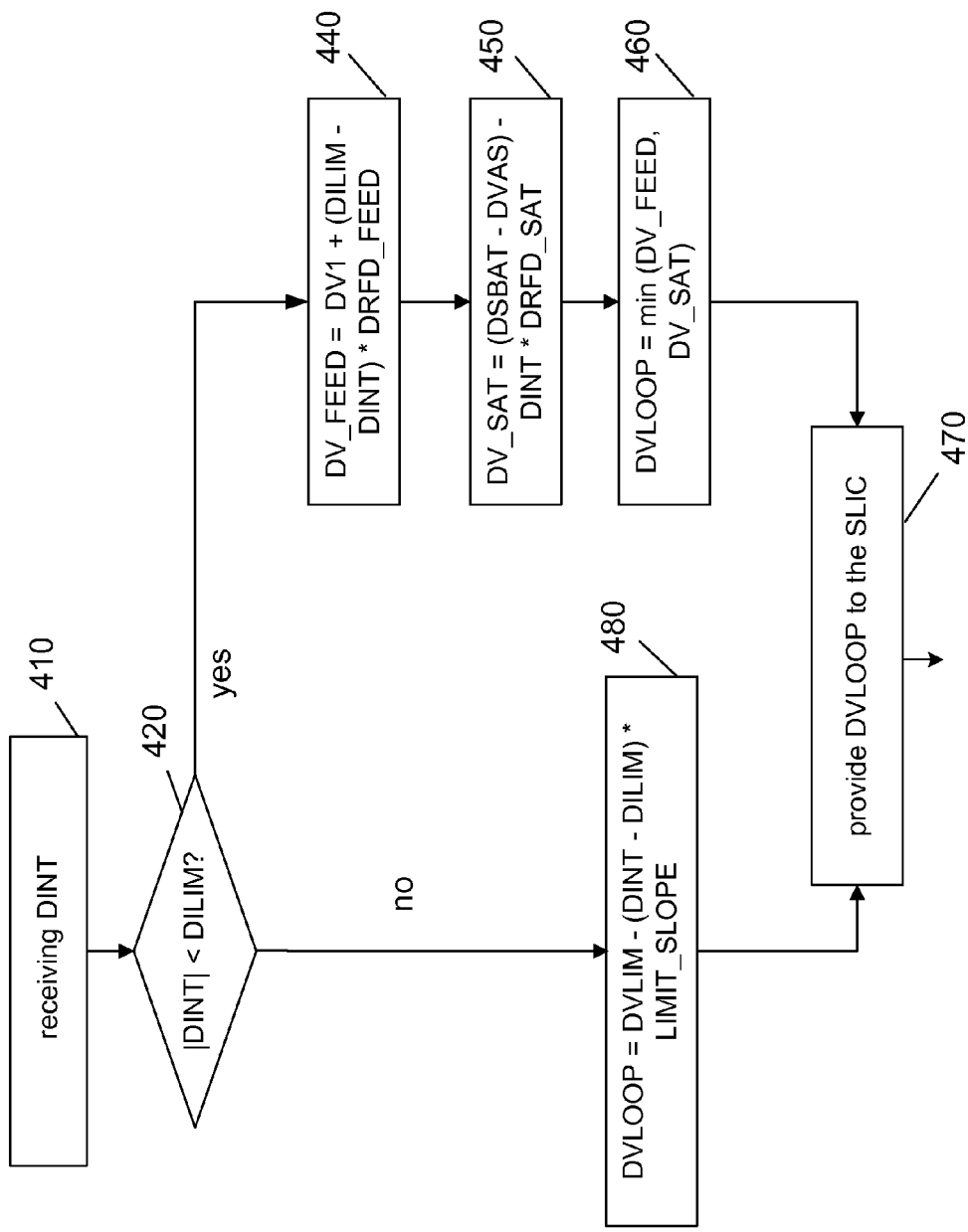
FIG. 5 illustrates a method in accordance with the present invention that may be implemented by the line card of FIG. 2.

FIG. 5 illustrates a method of DC feed control in accordance with the present invention. At block 410, the DC feed logic 321 receives an input signal, DINT, from the DC cancellation logic 315. At block 420, the DC feed logic 321 compares the input signal with the DILIM value, which, as mentioned above, represents the upper limit of the loop current in the current limit region of the DC feed curve implemented by the DC feed logic 321. Equation (1) below illustrates the relationship between ILIM, the line card current and DILIM:

$$ILIM = \frac{KCN \cdot VCN_{mx}}{KIMT \cdot RCN} DILIM, \qquad (1)$$

where KIMT is the current gain to the IMT terminal 275 of the SLIC 30; $VCN_{mx}$ is the voltage from the CANC terminal 270 of the SLIC 30 with unity digital input; RCN is the summation of the two resistors 292, 294; KCN is the current gain from the CANC terminal 270 of the SLIC 30 to the IMT terminal 275; and DILIM is the digital representation of the current limit inside the SLAC 215. The DILIM value may be a programmable value. Although not so limited, in the illustrated embodiment, the absolute value of DINT is compared to DILIM. A value of DINT being less than the DILIM value is an indication that the line card 10 is operating in either the anti-saturation region or the resistance feed region. Conversely, a DINT value greater than the DILIM value is an indication that the line card 10 is operating in the current limit region of the DC feed curve.

If the value of DINT is less than the DILIM value, then, at block 440, the DC feed logic 321 calculates a voltage control signal (DV_FEED) in the resistance feed region. In the illustrated embodiment, DV_FEED is calculated based on equation (2) below:

$$DV\_FEED = DV1 + (DILIM - DINT) * DRFD\_FEED \qquad (2)$$

The output line voltage, V_FEED, is defined by equation (3):

$$V\_FEED = VHL_{mx} * KHL * DV\_FEED \qquad (3)$$

where $VHL_{mx}$ is the voltage at the VHL terminal 323 with a unity digital input and KHL is the open circuit voltage gain of the SLIC 30 from the DCIN terminal 265.

In this region, any DC signal from the IMT terminal 275 of the SLIC 30 is integrated, causing the signal, DCANC, at the CANC terminal 290 to either increase or decrease. In the resistance feed region, the DCANC signal is fed back to the IMT terminal 275 through the CANC terminal 270 of the SLIC 30. The circuit stabilizes when the DCANC feedback substantially cancels the current sensed from the subscriber line 225. Equation (4) below illustrates the relationship between DINT and the corresponding stable line current ($I_2$) in the resistance feed or anti-saturation regions:

$$\frac{VCN_{mx}}{RCN} \times KCN \times DINT(DC) = KIMT \times I_2(DC), \qquad (4)$$

solving for $DINT$:

$$DINT(DC) = \frac{KIMT}{KCN} \frac{RCN}{VCN_{mx}} \times I_2(DC), \qquad (5)$$

where KIMT, $VCN_{mx}$, RCN and KCN are as defined earlier.

At block 450, the DC feed logic 321 calculates a voltage (DV_SAT) in the anti-saturation region. In the illustrated embodiment, DV_SAT is calculated based on equation (6) below:

$$DV\_SAT = DSBAT - DVAS - DINT * DRFD\_SAT \qquad (6)$$

The output line voltage in the anti-saturation region is:

$$V\_SAT = VHL_{mx} * KHL * DV\_SAT, \qquad (7)$$

where DSBAT is the measurement of the battery voltage. DVAS and DRFD_SAT are user programmable parameters. DCANC is defined earlier for the resistance feed region. At block 460, the DC feed logic 321 calculates an output voltage, DVLOOP, based on the input, DINT, from the DC cancellation logic 315. The DC feed logic 321 determines DVLOOP using equation (8) below:

$$DVLOOP = \min(DV\_FEED, DV\_SAT) \qquad (8)$$

where DV_FEED and DV_SAT are the values calculated by equations (2) and (6), respectively. The DC feed logic 321 determines the lesser of the DV_FEED and DV_SAT voltages and provides, at block 470, the smaller value as its output. V_FEED is the normal feed voltage; however, V_SAT must be used if it is smaller to prevent saturation of the amplifiers. The output voltage of the DC feed logic 321 is ultimately applied by the SLIC 30 of the subscriber line 225.

If the value of DINT, at the block 420, is greater than the value of DILIM, then it is an indication that the line card 10 is operating in the current limit region 350 of the DC feed curve. At block 480 (see FIG. 4), the DC feed logic 321 utilizes the synthesized LIMIT_SLOPE curve 405 to determine its output, DVLOOP, as shown in equation (9) below:

$$DVLOOP = DV\_LIM - (DINT - DILIM) * LIMIT\_SLOPE, \qquad (9)$$

where DILIM is as defined earlier. The output of the DC cancellation logic 315 has a different behavior in this region, because there is no connection from DCANC to the CANC terminal 290 of the SLAC 215. Instead, a constant value of DILIM drives the CANC terminal 290. In the current limit region, the DINT signal is proportional to the integral of VIN, which is proportional to the difference between the actual line current and the intended current limit. This signal will only stabilize when the line current is equal to the intended limit current. The difference in the two currents is integrated to produce DINT and this signal is used to produce a line voltage. The value of DINT will increase or decrease until the two currents are equal. Because the line voltage varies with the integral of the current difference, the circuit looks like a capacitor in parallel with a current source of ILIM.

As mentioned above, if the line card 10 is operating in the current feed region 350, the current limiter 317 (see FIG. 2) outputs either a positive or negative DILIM signal to the CANC input 270 of the SLIC 30, depending on the polarity of the DINT signal. The DC feed logic 321 adjusts the loop voltage, VLOOP, such that the VLOOP=RLOOP * ILIM. To do this, the DC feed logic 321, in accordance with the present invention, synthesizes an artificial curve, LIMIT_SLOPE, in the current limit region 350 to determine the value of DVLOOP, as described in more detail below with respect to FIG. 6.

Figure 6:
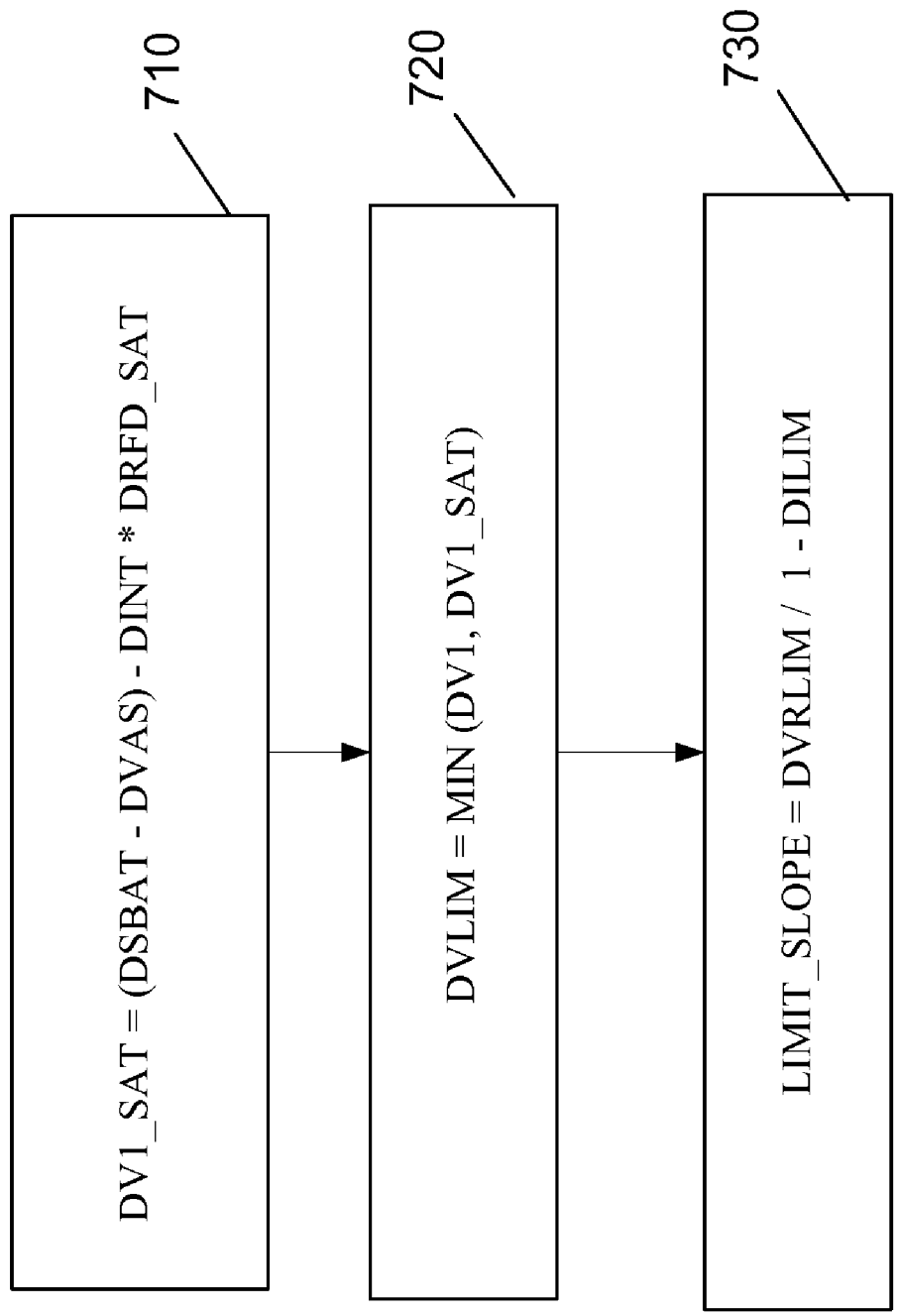
FIG. 6 depicts a method for synthesizing a DC feed curve in accordance with the present invention that may be implemented by the line card of FIG. 2.
Figure 7:
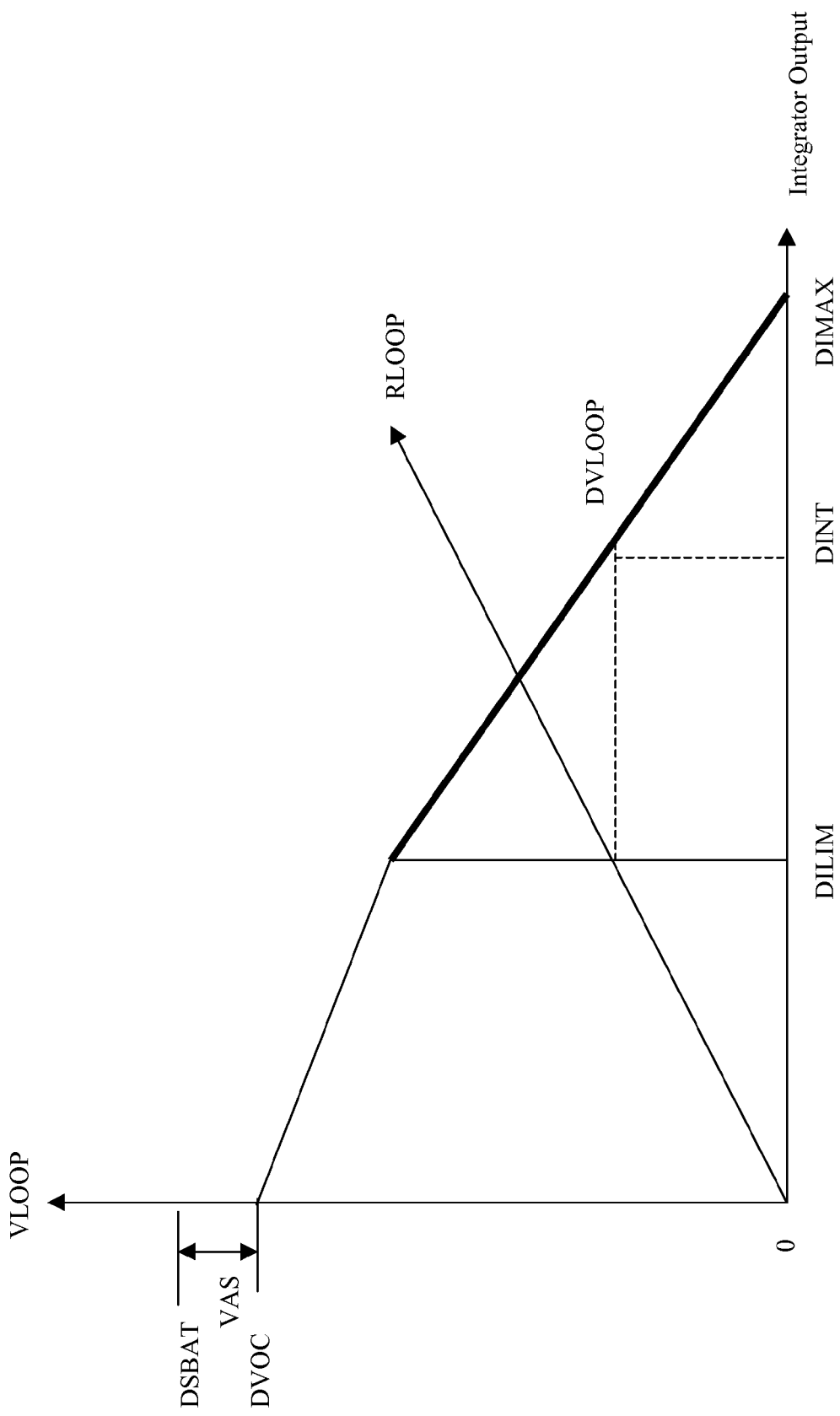
FIG. 7 illustrates a synthesized portion of the DC feed curve in accordance with the present invention that may be utilized by the line card of FIG. 2.

FIG. 6 illustrates a method of synthesizing the LIMIT_SLOPE curve 405 in the current limit region 350 of the DC feed curve of FIG. 3. Additionally, FIG. 7 illustrates a synthesized portion of the DC feed curve of FIG. 3 in accordance with the present invention that may be utilized by the line card 10 of FIG. 2.

The parameter DV_LIM sets the initial voltage where the current limit region begins. If there is a resistive feed region, DV_LIM=DV1. Sometimes, the battery voltage is so low that the resistive feed region disappears, as is shown in FIG. 7. Referring back to FIG. 6, the method of FIG. 6 begins at block 710, where DV1_SAT is defined as (DSBAT−DVAS)−DINT * DRFRD_SAT. In a situation where there is no resistive feed region, DV_LIM, at block 720, is calculated from the equation for the anti-saturation region with an assumed current signal of DILIM, as shown in equation (10) below:

$$DV\_LIM = \min\{DV1, DV1\_SAT\} \qquad (10)$$

At the time when the circuit enters the current limited region, DINT has a value slightly more than DILIM. In equation (9), it is possible to reduce DINT by DILIM to approximately zero at the start of current limiting, so that DILIM need not be subtracted on each cycle. This leads to Equation 11 below:

$$DVLOOP = DV\_LIM - DINT * IMIT\_SLOPE \qquad (11)$$

In a fixed point DSP with fractional numbers, DINT cannot be larger than unity; hence, LIMIT_SLOPE must be no smaller than DV_LIM, so that DVLOOP can be driven to zero when the line is shorted. Making LIMIT_SLOPE equal to DV_LIM results in maximum filtering. Making DV_LIM=1 results in a constant degree of filtering of the current limit.

An alternate implementation modifies Equation (9) to obtain Equation (12):

$$DVLOOP = DV\_LIM * \left[1 - \frac{DINT - DILIM}{DV\_LIM} * LIMIT\_SLOPE\right] \qquad (12)$$

If DINT is limited to 1, and to vary DVLOOP from zero to DINT, then it follows that LIMIT_SLOPE should be greater or equal to $$\frac{DV\_LIM}{1 - DILIM}.$$

Thus, at block 730, LIMIT_SLOPE is determined to be $$\frac{DV\_LIM}{1 - DILIM}.$$

Using $$LIMIT\_SLOPE = \frac{DV\_LIM}{1 - DILIM}$$

results in Equation 13 (see the block 480 of FIG. 5):

$$DVLOOP = DV\_LIM * \left[1 - \frac{DINT - DILIM}{1 - DILIM}\right] \qquad (13)$$

The value of LIMIT_SLOPE above will allow the VLOOP to vary from V1 to zero linearly in the current limit region. For example, if RLOOP is zero, then VLOOP should be substantially zero, which ensures that the DC cancellation loop 298 has enough current driving to maintain the current limit behavior. Larger values of LIMIT_SLOPE could be selected, however, this would result in coarser voltage steps and more noise.

Based on the digital value, DVLOOP, the SLIC 30 provides an analog equivalent voltage value, OUTPUT_LOOP, to the subscriber line 225. Equation (14) below illustrates the relationship between DVLOOP and OUTPUT_LOOP:

$$OUTPUT\_LOOP = VHL_{mx} * KHL * DVLOOP, \qquad (14)$$

where $VHL_{mx}$, KHL, and DVLOOP have been defined above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for direct current (DC) feed control for a line card capable of being coupled to a subscriber line, comprising:

determining if the line card is operating in a current limit region of a direct current (DC) feed curve that includes the current limit region and at least one of an anti-saturation region and a resistance feed region, wherein the act of determining if the line card is operating in the current limit region comprises determining if a first value representative of DC current on the subscriber line is greater than a current limit value;

determining a second value representative of a difference between the first value and the current limit value based on determining that the first value is greater than the current limit value;

determining a representative loop voltage based on a relation between the second value and a synthesized curve, wherein the synthesized curve is in the current limit region of the DC feed curve, and wherein the synthesized curve is a linear curve with a negative slope, and wherein the relation comprises the representative loop voltage being equal to a predetermined voltage value added to a product of the slope of the synthesized curve and the second value; and applying a loop voltage to the subscriber line, wherein the loop voltage applied to the subscriber line is based on the representative loop voltage.

2. The method of claim 1, further including determining the loop voltage in at least one of the anti-saturation region and the resistance feed region in response to determining the line card is not operating in the current limit region.

3. A method for direct current (DC) feed control for a line card, comprising:

generating a current value proportional to a loop current flowing from a subscriber line;

determining if the line card is operating in a current limit region of a direct current (DC) feed curve that includes the current limit region and at least one of an anti-saturation region and a resistance feed region in response to generating the current value, wherein the act of determining if the line card is operating in the current limit region comprises determining if a first value representative of DC current on the subscriber line is greater than a current limit value;

determining a second value representative of a difference between the first value and the current limit value based on determining that the first value is greater than the current limit value;

determining a representative loop voltage based on a relation between the second value and a synthesized curve in the current limit region of the DC feed curve, wherein the curve is a linear curve with a negative slope, and wherein the relation comprises the representative loop voltage being equal to a predetermined voltage value added to a product of the slope of the synthesized curve and the second value; and applying a loop voltage to the subscriber line, wherein the loop voltage applied to the subscriber line is based on the representative loop voltage.

4. The method of claim 3, further including determining the loop voltage in at least one of the anti-saturation region and the resistance feed region in response to determining the line card is not operating in the current limit region.

5. An apparatus, comprising:

a digital signal processor for:

determining if a line card is operating in a current limit region of a direct current (DC) feed curve that includes the current limit region and at least one of an anti-saturation region and a resistance feed region, wherein the act of determining if the line card is operating in the current limit region comprises determining if a first value representative of DC current on the subscriber line is greater than a current limit value; and determining a second value representative of a difference between the first value and the current limit value based on determining that the first value is greater than the current limit value;

determining a representative loop voltage based on a relation between the second value and a synthesized curve in the current limit region of the DC feed curve, wherein the curve is a linear curve with a negative slope, and wherein the relation comprises the representative loop voltage being equal to a predetermined voltage value added to a product of the slope of the synthesized curve and the second value; and a circuitry for applying a loop voltage to a subscriber line, wherein the loop voltage applied to the subscriber line is based on the representative loop voltage.

6. The apparatus of claim 5, wherein the synthesized curve is based on an anti-saturation region and the current limit region of the DC feed curve.

7. The apparatus of claim 5, wherein the digital signal processor is further for determining the loop voltage in at least one of the anti-saturation region and the resistance feed region in response to determining the line card is not operating in the current limit region.

8. A line card, comprising:

a digital signal processor for:

determining if a line card is operating in a current limit region of a direct current (DC) feed curve that includes the current limit region and at least one of an anti-saturation region and a resistance feed region, wherein the act of determining if the line card is operating in the current limit region comprises determining if a first value representative of DC current on the subscriber line is greater than a current limit value;

determining a second value representative of a difference between the first value and the current limit value based on determining that the first value is greater than the current limit value;

determining a representative loop voltage based on a relation between the second value and a synthesized curve in the current limit region of the DC feed curve, wherein the curve is a linear curve with a negative slope, and wherein the relation comprises the representative loop voltage being equal to a predetermined voltage value added to a product of the slope of the synthesized curve and the second value; and a subscriber line interface circuit for applying a loop voltage to the subscriber line, wherein the loop voltage applied to the subscriber line is based on the representative loop voltage.

9. The line card of claim 8, wherein the digital signal processor is further for determining the loop voltage in at least one of the anti-saturation region and the resistance feed region in response to determining the line card is not operating in the current limit region.

10. The line card of claim 8, wherein the subscriber line interface circuit is a voltage-feed subscriber line interface circuit.

11. An apparatus, comprising:
- means for determining if a line card adapted to be coupled to a subscriber line is operating in a current limit region of a direct current (DC) feed curve that includes the current limit region and at least one of an anti-saturation region and a resistance feed region, wherein the act of determining if the line card is operating in the current limit region comprises determining if a first value representative of DC current on the subscriber line is greater than a current limit value;
- means for determining if the line card is operating in a current limit region of a direct current (DC) feed curve in response to generating a current value;
- means for determining a second value representative of a difference between the first value and the current limit value based on determining that the first value is greater than the current limit value;
- means for determining a representative loop voltage based on a relation between the second value and synthesized curve in the current limit region, wherein the curve is a linear curve with a negative slope, and wherein the relation comprises the representative loop voltage being equal to a predetermined voltage value added to a product of the slope of the synthesized curve and the second value; and
- means for applying a loop voltage to the subscriber line, wherein the loop voltage applied to the subscriber line is based on the representative loop voltage.

12. The method of claim 1, farther comprising:
- receiving, using a first path, a signal and determining a cancellation current proportional to a current flowing from the subscriber line; and
- adjusting, using a second path, a DC level control based on the determined cancellation current, wherein adjusting a DC level control comprises providing a voltage to the subscriber line based on the cancellation current.

13. The method of claim 12, wherein the first path comprises an integrator for integrating the second value representative of a difference between the first value and the current limit value based on determining that the first value is greater than the current limit value.

14. The apparatus of claim 5, farther comprising:
- a first path for receiving a signal and determining a cancellation current proportional to a current flowing from the subscriber line; and
- a second path for adjusting a DC level control based on the determined cancellation current, wherein adjusting the DC level control comprises providing a voltage to the subscriber line based on the cancellation current.

15. The apparatus of claim 14, wherein the first path comprises an integrator for integrating the second value representative of a difference between the first value and the current limit value based on determining that the first value is greater than the current limit value.

16. The method of claim 1, wherein the predetermined voltage value represents a voltage value at which the current limit region begins.

* * * * *